Nov. 11, 1924. 1,515,289
J. T. TULLIS
CLOTH MEASURING AND CUTTING MACHINE
Original Filed July 7, 1920  14 Sheets-Sheet 3

J.T.Tullis Inventor

Witness

By C.A.Snow&Co.
Attorneys

Nov. 11, 1924.  
J. T. TULLIS  
1,515,289  
CLOTH MEASURING AND CUTTING MACHINE  
Original Filed July 7, 1920  14 Sheets-Sheet 5

J.T.Tullis, Inventor

Witness

By C.A.Snow & Co.
Attorneys

Nov. 11, 1924.

J. T. TULLIS 1,515,289

CLOTH MEASURING AND CUTTING MACHINE

Original Filed July 7, 1920   14 Sheets-Sheet 6

Fig. 6.

J. T. Tullis, Inventor

Witness

By C. A. Snow & Co.
Attorneys

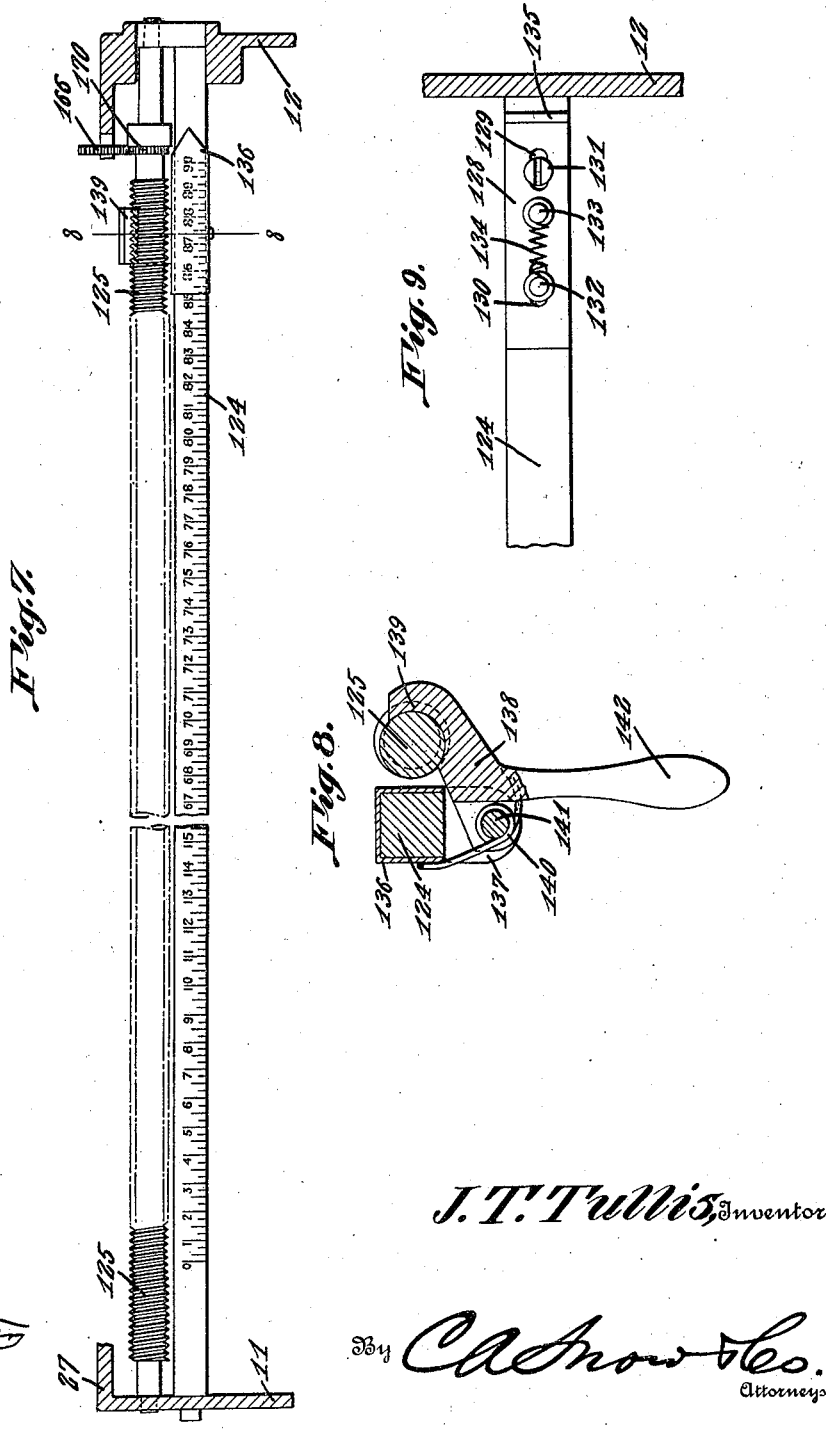

Nov. 11, 1924.

J. T. TULLIS 1,515,289

CLOTH MEASURING AND CUTTING MACHINE

Original Filed July 7 1920   14 Sheets-Sheet 8

J. T. Tullis, Inventor

Witness

By C. A. Snow & Co.
Attorneys

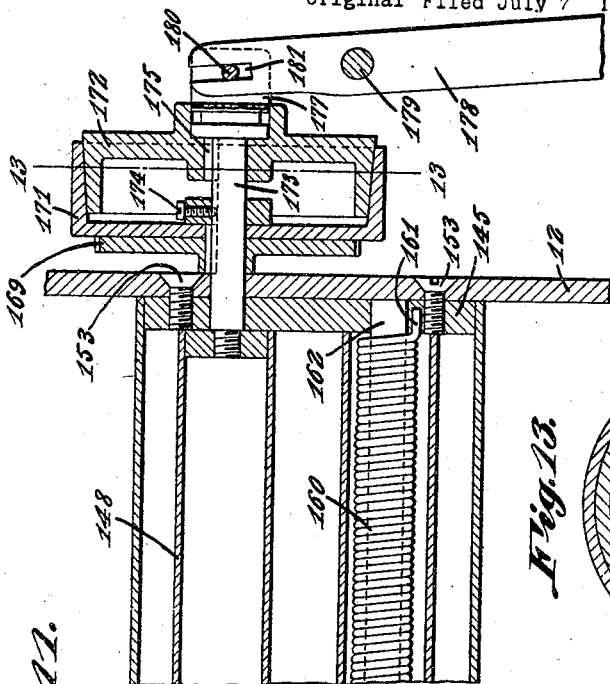

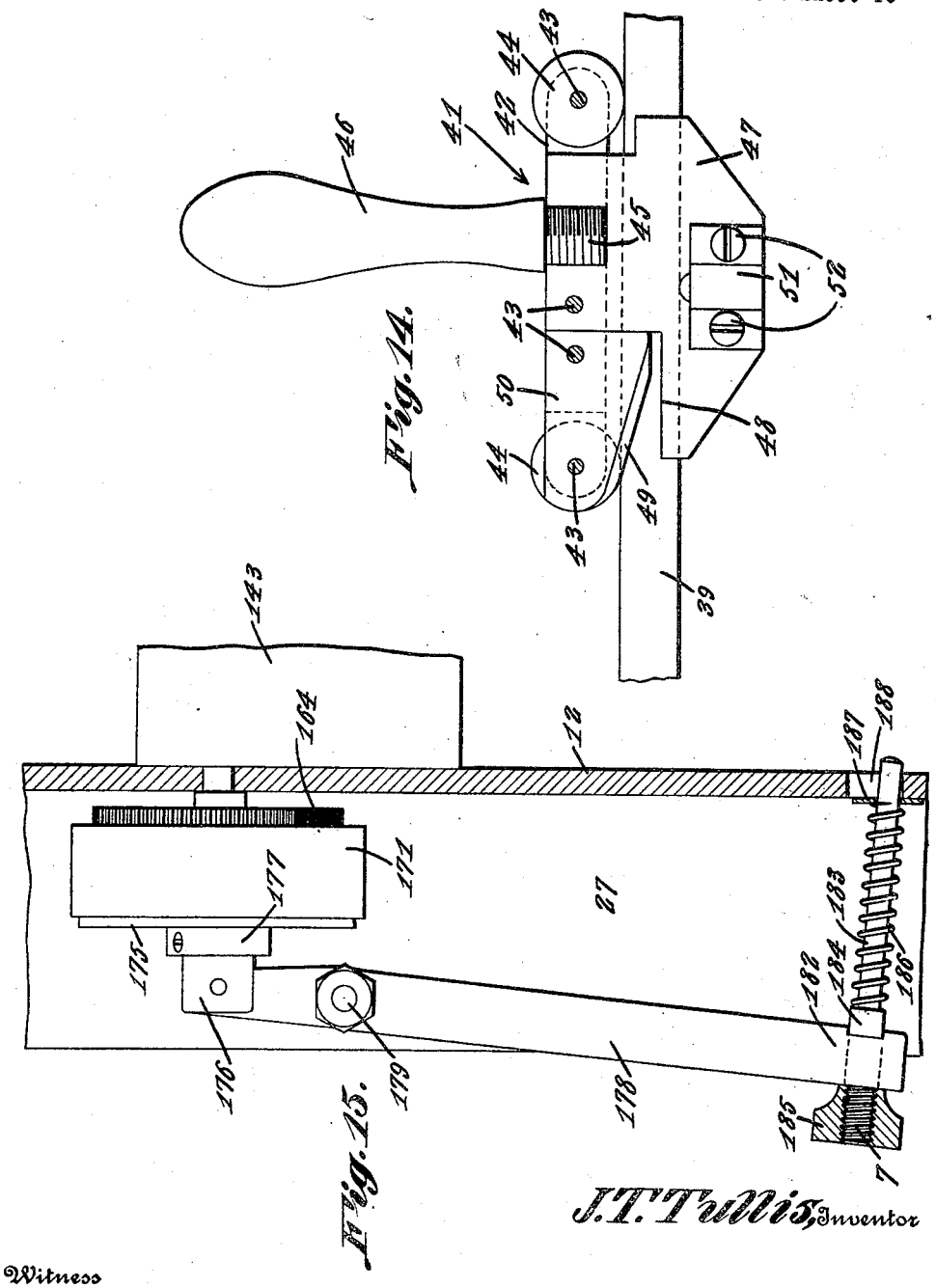

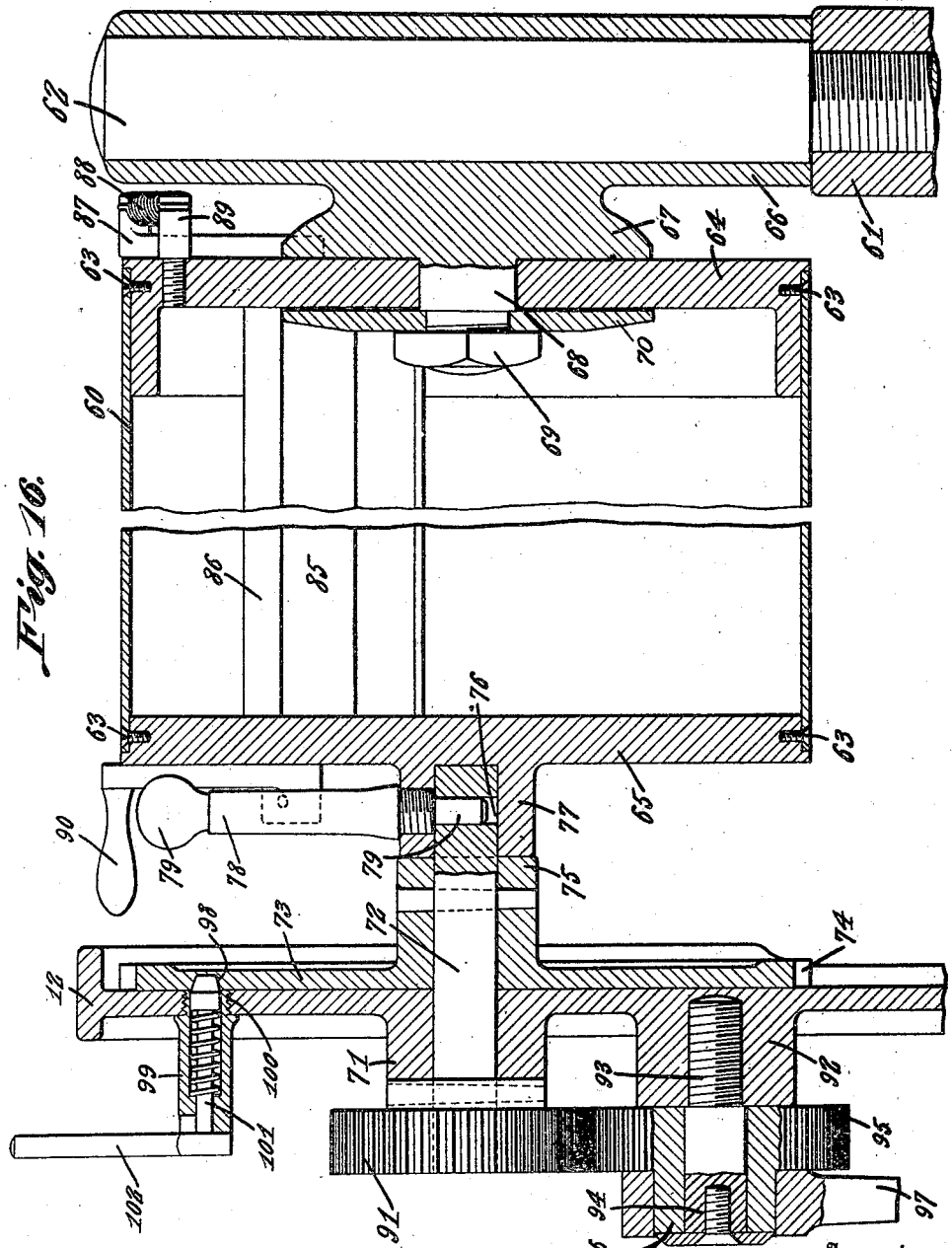

Nov. 11, 1924.
J. T. TULLIS
1,515,289
CLOTH MEASURING AND CUTTING MACHINE
Original Filed July 7 1920    14 Sheets—Sheet 12
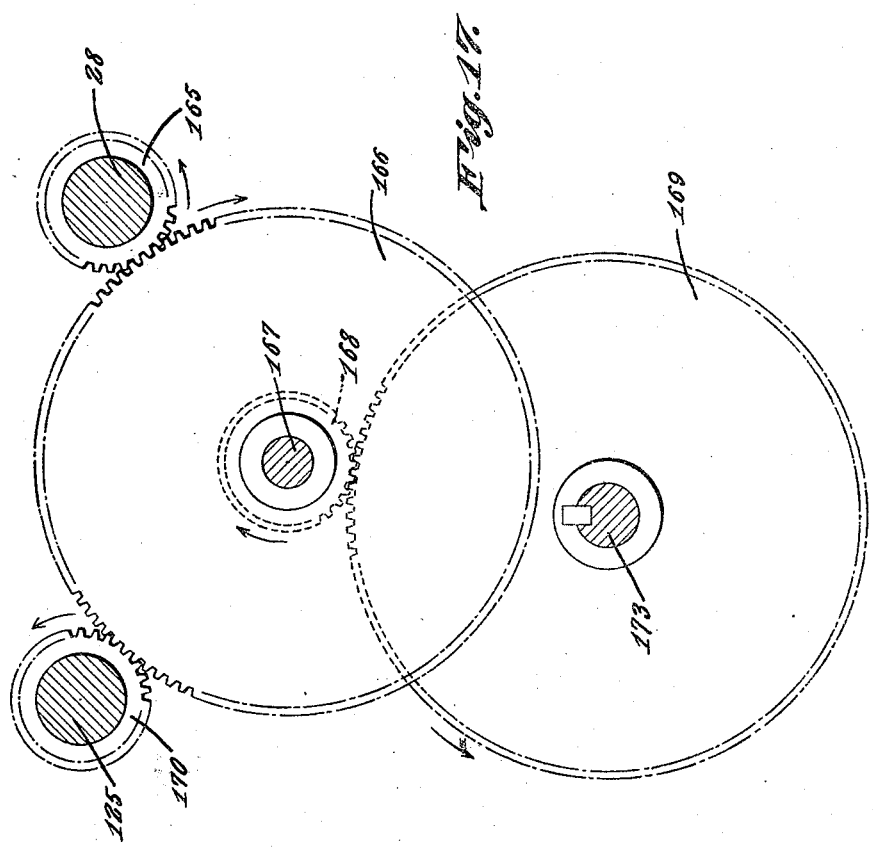

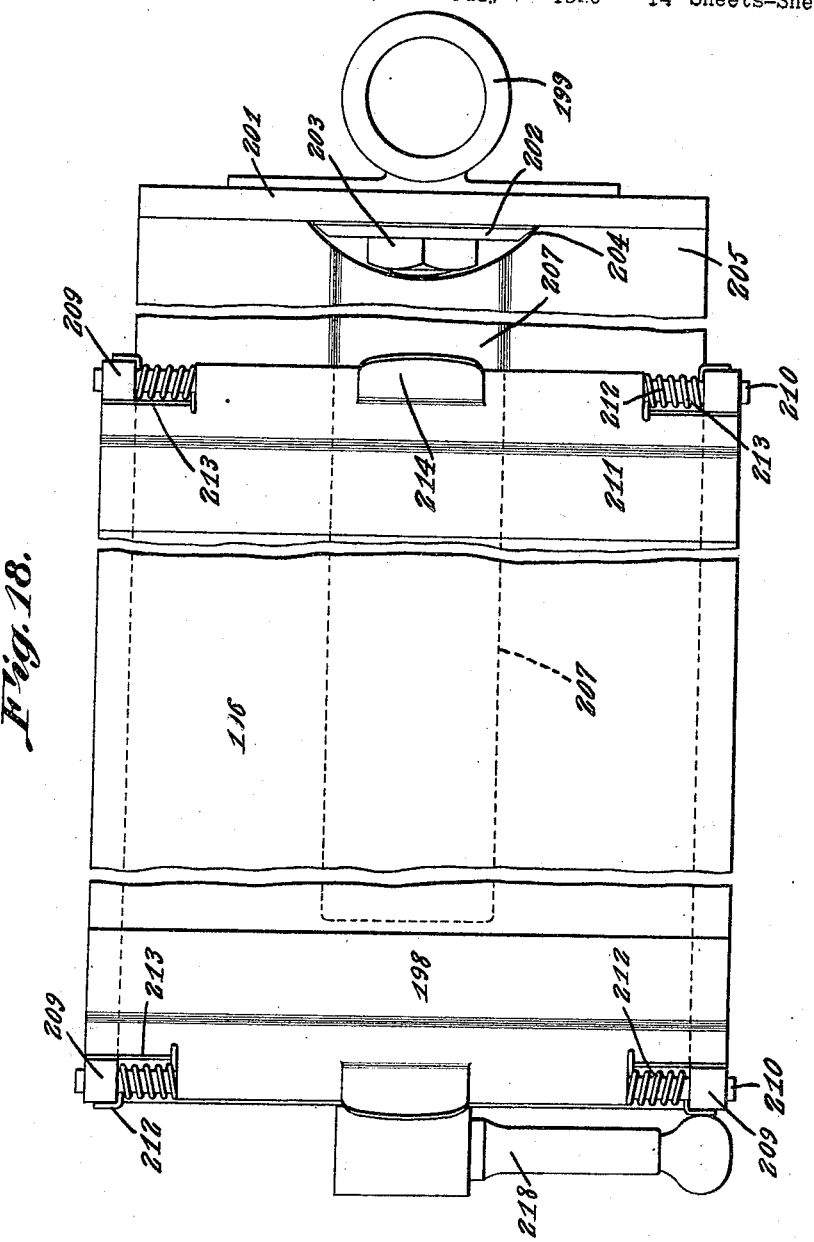

Nov. 11, 1924.

J. T. TULLIS 1,515,289

CLOTH MEASURING AND CUTTING MACHINE

Original Filed July 7 1920   14 Sheets-Sheet 14

J.T.Tullis, Inventor

By C.A.Snow&Co.
Attorneys

Patented Nov. 11, 1924.

1,515,289

UNITED STATES PATENT OFFICE.

JOHN THOMAS TULLIS, OF EL DORADO, ARKANSAS.

CLOTH MEASURING AND CUTTING MACHINE.

Application filed July 7, 1920, Serial No. 394,557. Renewed October 4, 1924.

*To all whom it may concern:*

Be it known that I, JOHN THOMAS TULLIS, a citizen of the United States, residing at El Dorado, in the county of Union and State of Arkansas, have invented a new and useful Cloth Measuring and Cutting Machine, of which the following is a specification.

This invention relates to an improved cloth measuring and cutting machine of that type having a concaved basket or receptacle adapted to receive a bolt of cloth or similar sheet material and a roller or bolt holding means to which the free end of the cloth is attached or clamped so as to be rotated for winding the cloth thereon, the bolt of cloth or other material in strip form, in the basket or receptacle, being designed to turn or flop over as the cloth is unwound therefrom or unrolled from the bolt. One of the objects is to provide means to cooperate with the cloth for measuring the same as unrolled from the bolt so as to determine the total number of yards therein, as when taking an invoice of stock on hand, or for the purpose of measuring and cutting off any desired length or number of yards to be dispensed, improved means being provided for cutting the cloth in cooperation with the unwinding and measuring means, so as to insure accurate measurement and dispensing of the cloth in a manner which eliminates the usual trouble, time and waste of material incident to the ordinary or any known method of measuring and cutting cloth; the machine being also designed to wind or roll the cloth as the same is unrolled from the bolt, or so that it can be readily removed and folded for wrapping purposes.

The invention contemplates and provides improved means for holding the bolt within the basket or the receptacle so as to accommodate different widths of material and prevent the bolt from shifting relative to one side. It is also designed to improve the feeding means whereby the same is prevented from slipping and so as to insure accurate measurement. A still further object is to provide an improved means for measuring the material as the same is unwound and for indicating the length of the material so that the same can be readily observed without the necessity of counting, the number of revolutions imparted to a rotating indicator or pointer hand which heretofore rendered measurement difficult, said measuring device being so constructed that it may be set to measure off any desired length of material and to automatically stop the operation of the machine when such given or desired length of material in yards, including fractions thereof, or any other standard of measurement of lineal measure, has been unwound or unrolled from the bolt, fed through the machine to actuate the measuring device and wound on a roller or bolt as heretofore specified. A further object is to provide an improved chart or tape forming a part of the measuring device so that computations as to the cost of any number of yards or any desired length of material at a certain cost per yard may be made and indicated automatically without requiring any calculations or figuring on the part of the clerk or operator. Another object is to provide improved means for illuminating the indicating and measuring device, and chart thereof when the feeding device is operative and to throw the same out of operation or extinguish the same when the feeding device is inoperative. A still further object is to provide improved cutting means for severing the cloth accurately at the point where the measurement of the material is effected so that the material will be cut straight and can be cut quickly and accurately without the annoyance or necessity of using scissors, and to provide improved means for holding a roller or bolt and clamping the free end of the cloth thereto and for turning the same, preferably, so that a predetermined number of revolutions of the cylinder or roller will result in dispensing or measuring off a certain number of yards or length of material either in making a sale or in taking stock, so that the material when removed is either folded for wrapping or wound on a bolt without requiring further winding in order to place the same in condition to be dispensed or sold, and said winding or bolting means cooperating with the stopping means so as to indicate when the desired length has been measured off and is ready to be cut for sale and delivery, thereby saving considerable time and labor for the operations specified, to say nothing of the trouble and waste incident to methods at present in vogue.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:

Figure 6 is an enlarged transverse sectional view taken on the line 6—6 of Figure 1, portions being broken away;

Figure 7 is a horizontal sectional view taken on the line 7—7 of Figure 6 and looking downwardly through the scale device for measuring the number of yards in a bolt;

Figure 8 is a sectional view taken on the line 8—8 of Figure 7, the parts being enlarged;

Figure 9 is a detailed view of the bottom of the scale bar showing a portion of the automatic stop device;

Figure 11 is an enlarged longitudinal sectional view of rollers of the measuring mechanism and the clutch means cooperating therewith for throwing the same into and out of operation manually;

Figure 12 is an enlarged sectional view taken on the line 12—12 of Figure 11;

Figure 13 is a sectional view taken on the line 13—13 of Figure 11;

Figure 14 is an enlarged longitudinal sectional view through the cutting member;

Figure 15 is an enlarged vertical sectional view showing a detail of the clutch and operating lever therefor viewed from the opposite side from that shown in Fig. 11;

Figure 16 is an enlarged vertical longitudinal sectional view taken through the winding roller and its operating means and supports, the intermediate portion of the roller being broken away, the same being taken on the line 16—16 of Figure 1;

Figure 17 is an enlarged diagrammatic view showing the gearing arrangement employed in connection with the feeding, measuring and stopping mechanism, said section being taken substantially on line 17—17, Figure 6;

Figure 18 is an enlarged plan view of a bolting device for use in lieu of the winding roller or the cylinder shown in Figure 16.

Figure 3:
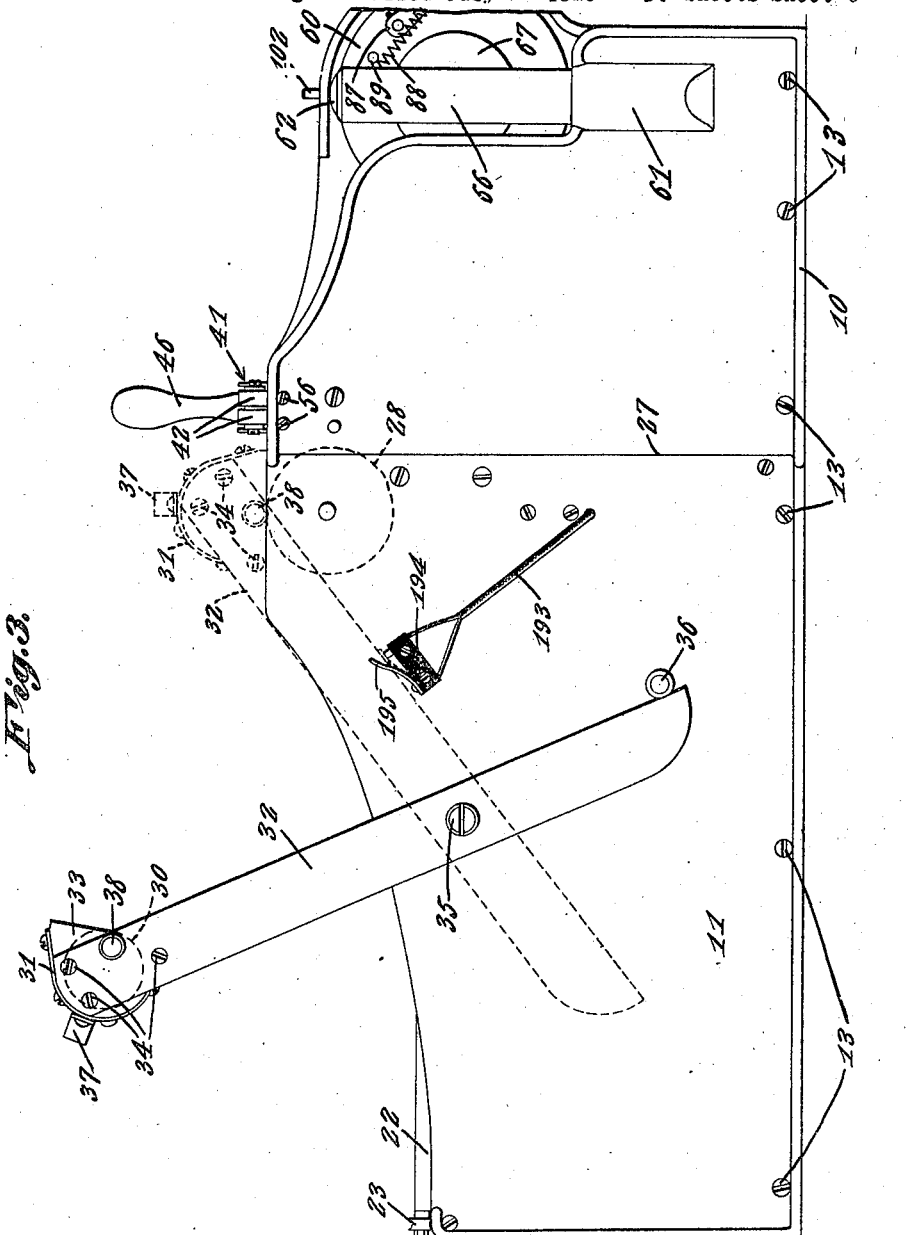
Figure 3 is an enlarged side elevation of one side with a portion of the winding roller broken away, the pressure roller of the feeding device being shown in a raised or inoperative position in full lines, and in an operative position in dotted lines.

Referring to the drawings in detail, in which like reference characters designate corresponding parts throughout the several views, my improved cloth measuring and cutting machine is shown as comprising a frame including a base or bottom portion 10, preferably of wood having upstanding parallel sides 11 and 12 preferably of metal such as aluminum in order to render the structure or appliance light in weight, said sides being shown fastened in position by screws or the like 13, Fig. 3. The sides are sufficiently spaced apart to accommodate a bolt of cloth or the like of maximum length of a strip of maximum width, therebetween and in order to hold the bolt consisting of the bolt proper 14, of wood or pasteboard on which the cloth 15 is wound, there is mounted between the sides, a concaved basket or receptacle 16 Fig. 5 preferably of sheet metal bent in the required form or shape and having one end bent downwardly as shown at 17 and anchored between the sides as indicated at 18, said anchored portion being rolled and disposed at a point intermediately of the front and rear ends of the frame. The forward end of the receptacle at its point of bend is lower than the rear thereof, which is bent over a cross rod 19 corresponding to the anchoring member 18, and then downwardly in a vertical position as indicated at 20, the lower end thereof being anchored at the rear edge of the base by screws or the like as indicated at 21.

Mounted in the basket or receptacle and shaped to conform thereto and yet remain slightly spaced from the interior surface of the basket is a partition 22 the rear end of which rotatably carries a grooved roller 23 designed to ride on the track formed at the rebent portion over the cross rod 19, the upper edge of the partition being inclined forwardly and having its opposite end apertured for slidable engagement with a cross rod 24 through the medium of a tubular extension or sleeve 25 arranged at right angles to the partition so as to receive the rod therethrough and permit the partition to be conveniently adjusted laterally in a vertical position parallel to the ends of the basket to suit the length of the bolt or width of the cloth, in which position it may be held by a set screw 26 engaged through the sleeve and with the rod. The sides of the frame adjacent to the end opposite the basket or receptacle are offset outwardly as indicated at 27 Figs. 1 and 5 and rotatably mounted between the sides 11 and 12 adjacent to said offset portions is a feed and measuring roller 28, the same being of a predetermined diameter or circumference, preferably nine inches or three-fourths of a foot around and being of metal and hollow as shown, with removable end sections or heads detachably secured thereto by screws or the like through the lateral section of the roller as indicated at 29, Fig. 1.

Figure 5:
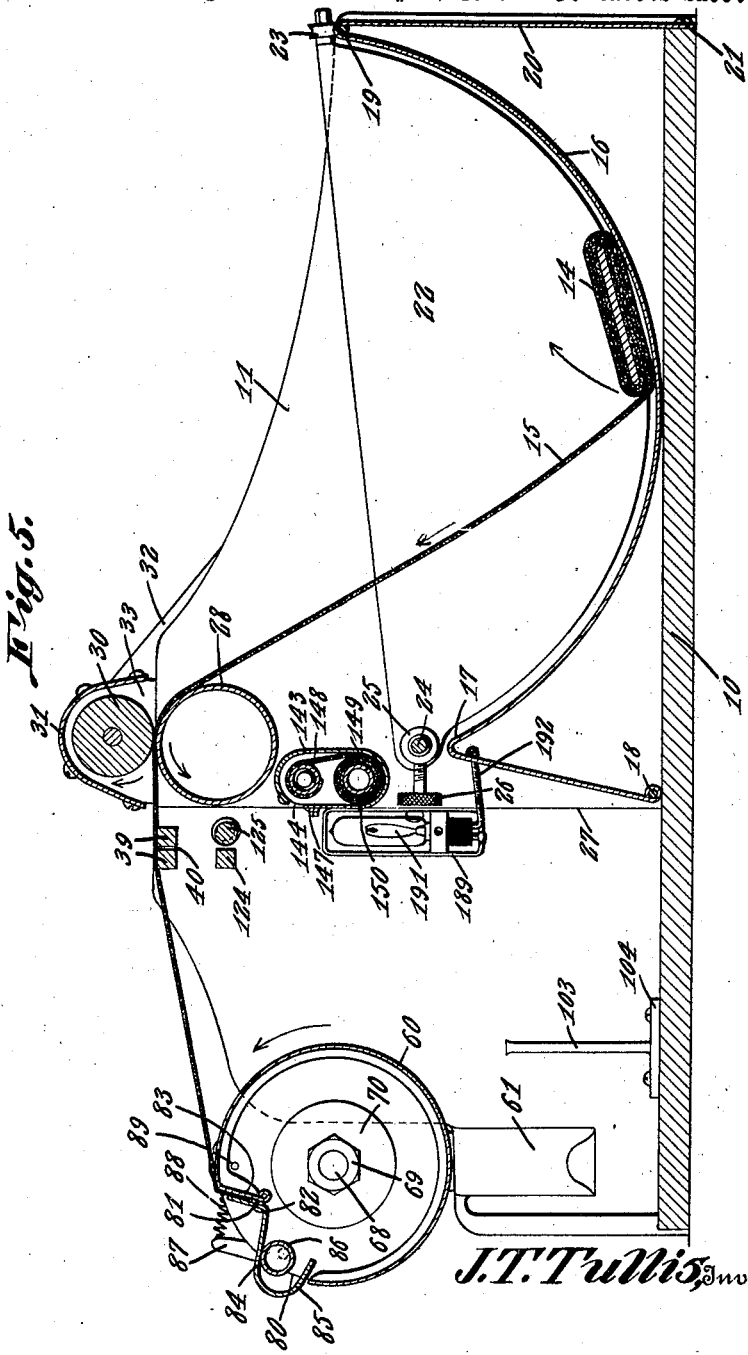
Figure 5 is a longitudinal sectional view taken on the line 5—5 of Figure 1, the parts being enlarged.

Cooperating with the feed roller 28 is a pressure roller 30 preferably of rubber or other suitable anti-slipping material, said pressure roller being positioned parallel to the feed roller so that the cloth passes over the feed roller and between the two rollers to rotate the same and particularly the feed roller as the cloth is moved along in being unwound from the bolt as particularly shown in Figure 5 of the drawings. As heretofore stated, the cloth is held frictionally or pressed against the feed roller by pressure roller 30 positioned thereover and rotatably mounted in the ends of an elongated casing or shield 31 open at the bottom and forming part of a yoke including side arms 32 Fig. 3 rigidly fixed to the ends 33 of the casing or shield as indicated at 34. The arms 32 are pivoted to the sides of the frame intermediately of their ends, as indicated at 35, the extended lowered ends of the arms being designed to contact at their forward edges with stops or limit pins 36 to limit the upward swinging movement of the arms in raising the pressure roller away from the feed roller from the position shown in dotted lines in Figure 3 to the position shown in solid lines, which operation is effected through the medium of a hand grip 37 attached to the top of the shield or casing 31 forming the cross member of the yoke.

In order to regulate the tension on the cloth, means is provided to regulate the ease of rotation of the pressure roller 30 and for this purpose an adjustable tension screw 38 Fig. 3 is mounted to extend through one end 33 of the shield so that the inner end thereof engages the adjacent end of the roller, the friction being regulated by adjustment of the screw. Thus, the cloth may be caused to run freely or slowly under friction according to the nature or quality of the cloth and to insure positive rotation of the feeding and measuring roller whereby accuracy is insured, as will be subsequently pointed out. After passing between the rollers, the cloth passes over a pair of spaced parallel connecting bars 39 Fig 5 between the outwardly offset side portions of the frame, said bars forming a brace connection for the sides of the frame at the upper edges thereof and a slotted guide, the slot of which is vertically disposed and designated as 40. The bars are preferably of rectangular cross section and straight so as to form a rectilinear guide slot for a cutting device generally designated at 41 Fig. 4.

The cutting device Fig. 14 comprises a slide or carriage including a pair of connected sections 42, the connections of which are designated at 43 so constructed as to render the same separable. The ends of the slide or carriage are carried by rollers 44 which travel on the top of the guide or track, the intermediate portion being provided with a threaded socket 45 at the coacting faces of the sections to detachably receive the shank portion of an operating handle 46 therein, said handle serving as means for shifting the slide across the guide for cutting the cloth. For this purpose, there is arranged between the sections 42, a plate 47 which is secured rigidly in position therebetween so as to extend downwardly between the bars 39 through the slot 40 and beneath said bars, where said plate is extended in opposite directions longitudinally between the bars for effectively guiding the same in a straight line. The forward extension of the plate forms a stationary jaw 48 with which cooperates the inclined upwardly and forwardly diverging cutting edge 49 of a blade 50 which is secured in alignment with the plate 47 between the sections 42 of the guide or carriage 41. It should be noted from the drawings, particularly Figure 14, that the cutting edge 49 extends above and below or intersects the upper edge of the slot 40 at the top faces of the bars 39 so that as the cloth passes thereover in the manner shown in Figure 5 it may be readily cut or severed at the slot by moving the cutting device across the guide or track in the direction in which the cutting edge of the blade extends.

In order to hold the slide or carriage down against the top of the guide or track and at the same time, permit it to give slightly to accommodate cloth of different thicknesses so that the latter will cut properly, suitable means are arranged on the plate 47 constituting a part of the slide or carriage to press resiliently against the bottom faces of the bars 39 forming the guide or track and in the illustrated embodiment, a slotted bracket 51 receives the lower edge of the plate 47 at the intermediate portion thereof and is detachably secured thereto as by means of transverse securing screws or the like 52. This bracket engages on opposite sides of the plate 47 and at each side, is provided with a vertical socket 53 Fig. 10 in its upper edge or face for receiving spring pressed plungers adapted to be forced against the bottom faces of the bars of the guide or track as particularly shown in Figures 10 and 14. These plungers (see Fig. 10) are in the form of ball bearings 54 projecting from the sockets and resting on the other ends of expansible helical springs 55 disposed in the sockets and resting on the bottom walls thereof. By this means, pressure is exerted against the bottom faces of the bars so as to hold the rollers 44 or other anti-friction members of the carriage against the top face of the track or guide and also tend to hold the blade with its cutting edge against the cloth.

Figure 4:
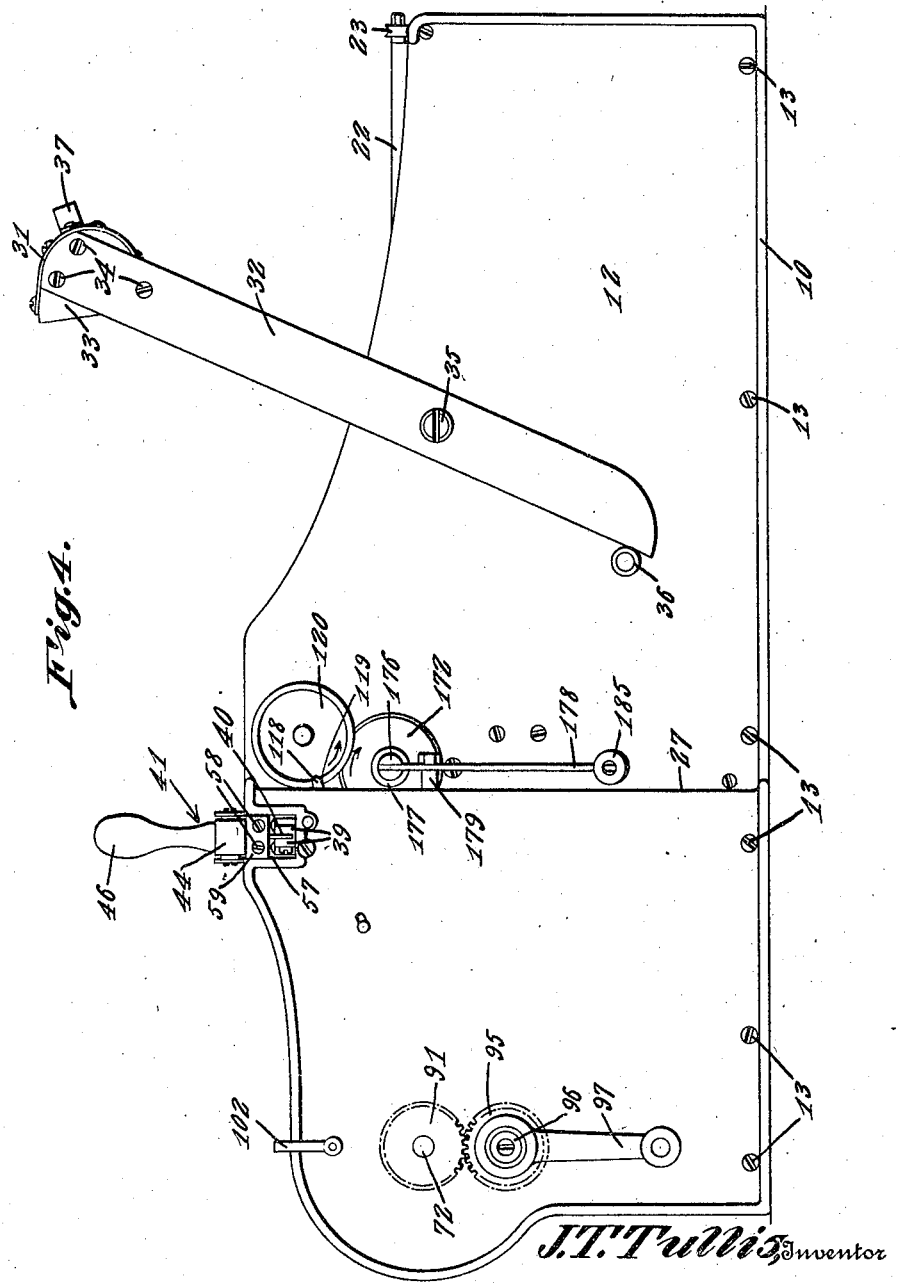
Figure 4 is a side elevation of the opposite side of the machine from that shown in Figure 3.

One side of the frame is arranged to secure the ends of the bars 39 as shown at 56, Fig. 3, and the opposite side is recessed as indicated at 57, Fig. 4, to receive the adjacent ends of the bars which are connected as shown at 58 by a plate 59 serving to retain the bars in true spaced parallel relation and permitting the insertion or engagement, or the disengagement of the cutting device with respect to the guide or track. By this means, the application and removal of the cutter is greatly facilitated.

At the sides of the frame near the front end thereof, are arranged bearings for supporting a drum or reel 60 Fig. 5 constituting a winding roller for the cloth unwound or unrolled from the bolt. For this purpose, one side 11 is arranged with an enlargement 61 (Figs. 5, 16 and 19) forming a socket internally threaded for receiving the lower threaded end of a vertical pivot 62, the drum which consists of a tubular body secured as shown at 63 Fig. 16 to the end portions or heads 64 and 65, is provided at the pivot end with a vertical pivot sleeve 66 designed to engage the pivot 62 in order that the drum may swing horizontally between and from between the outwardly offset side portions in moving to operative and inoperative positions in applying and removing the same as will be further explained. As shown, the pivot sleeve 66 is provided with lateral projection 67 having a horizontally projecting shank or stub-shaft 68 rotatably engaged by the apertured flanged end or head 64 of the drum, so that the latter will be free to turn. The stub-shaft is threaded at its inner end for engagement by a retaining member or nut 69, which in conjunction with an interposed washer 70, serves to retain the drum in position to turn.

Figure 10:
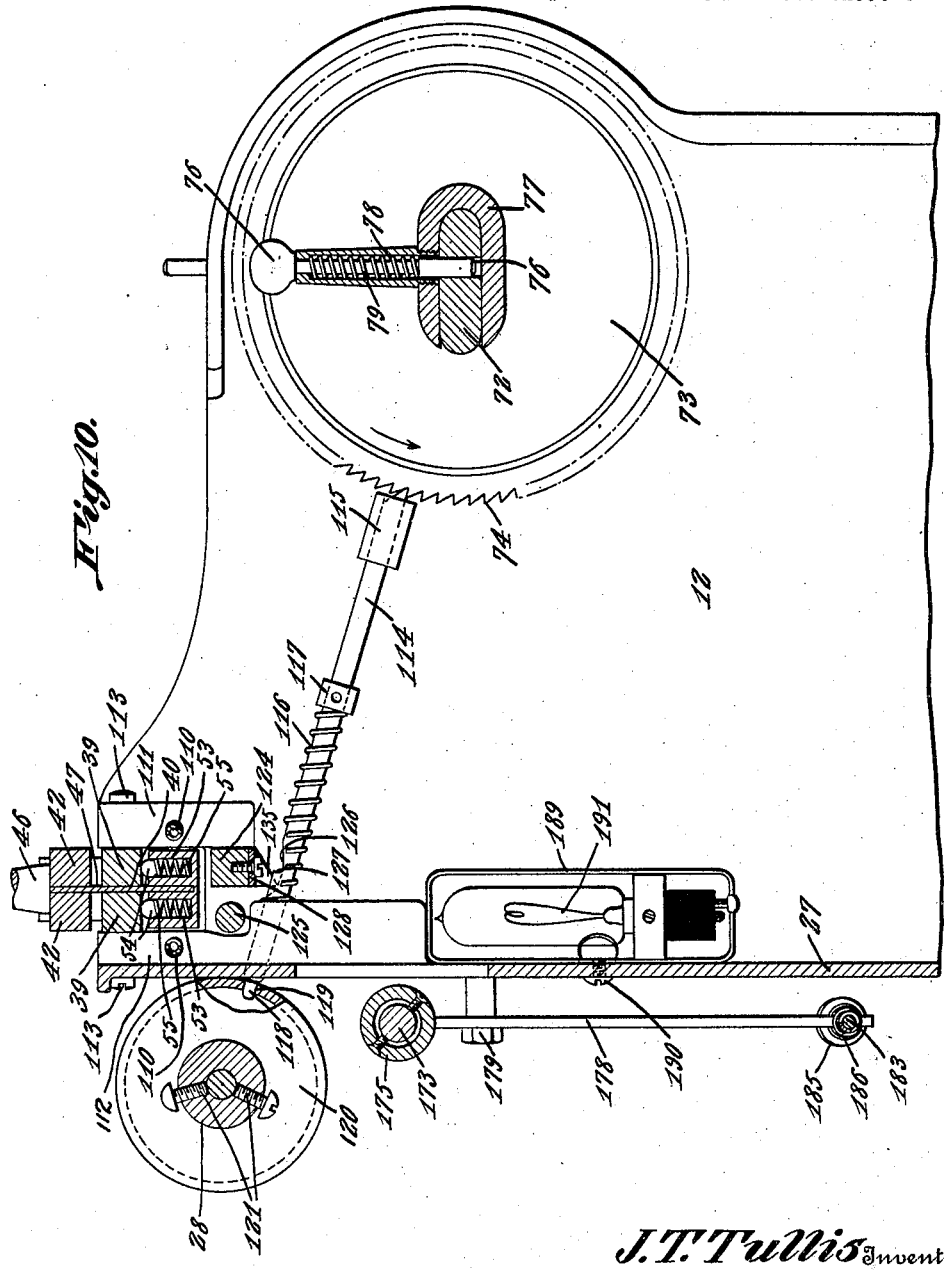
Figure 10 is an enlarged fragmentary longitudinal sectional view taken on the line 10—10 of Figure 1.

The opposite side 12 of the frame is provided with a bearing sleeve 71 projecting outwardly in horizontal alignment with the axis of shaft 68 and receives therein for rotation, a shaft 72 aligned axially with the shaft 68 and projecting inwardly of the frame so as to receive thereon a relatively large ratchet wheel 73 Figs. 10 and 16 having the peripheral ratchet teeth 74 and a sleeve 75 keyed or fixed to the shaft 72 so that the ratchet wheel will rotate with the shaft. The sleeve 75 projects inwardly but terminates short of the inner end of the shaft 72, the inwardly projecting end of the latter having a vertical aperture 76, said shaft 72 being flattened as shown in Figure 10 of the drawings and adapted to be engaged by the open sided or U-shaped projection 77 extending outwardly from the adjacent end or head 65 of the drum. Carried by the upper portion of this projection is a tubular casing 78, the same being threaded or otherwise detachably secured in position and carrying a spring pressed latch bolt 79 adapted to engage the aperture 76 in order to connect the drum and shaft 72 whereby the drum may be rotated when the shaft is turned, while at the same time permitting the drum to be readily applied or removed in order that a bolting device, which will be hereinafter explained may be used.

In order to clamp or connect the free end of the cloth to the winding drum or reel formed by the roller 60 so that the same will be effectively gripped against displacement quite irrespective of the tension between the feed and pressure rollers, the drum is provided with a peripheral slot 80 Fig. 5 and between and to the ends of the drum is pivoted a clamping plate 81, as shown at 82 to cooperate with an inwardly directed portion 83 extending partially across the drum in the direction of the chord of the arc of the circle so as to receive the bent free end of the cloth as clearly shown in Figure 5 of the drawings. The outer edge of the clamping plate terminates inwardly of the periphery of the drum and the inner edge is provided with an outwardly directed portion 84 terminating in an inwardly directed or rebent curved portion 85 the free end of which is extended within the slot 80 so as to accommodate an eccentrically mounted tube or camming rod 86, so mounted at the ends of the drum and adapted to be normally held in the position shown in Figure 5 whereby the jaw or clamping plate 81 will be held in a gripping position. For this purpose, the pivot of the eccentric rod at one end is provided with an arm 87 the free end of which has connection with the adjacent end of the drum by a contractile spring 88, as by means of an outstanding pin 89, thus causing the eccentric to engage the outwardly directed portion 84 of the angular clamping plate to normally hold the latter in position to grip the cloth. However, the plate or jaw may be released or permitted to move to a disengaged position separated from the inwardly directed portion or stationary jaw 83 by the overbalancing weight of the portions 84 and 85, and this is accomplished by releasing the eccentric against the action of the spring 88 through the medium of a crank handle 90 shown in Figs. 1 and 2 attached to the pivot at the opposite end of the eccentric and drum outwardly of the latter and between said end and the outwardly offset side portions of frame but in such a manner as to permit convenient manipulation thereof. In this connection it should be noted particularly in Figures 1 and 2 of the drawings that the drum 60 is substantially as long as the width of the frame at the basket or receptacle 16 and spaced apart at its ends from the outwardly offset side portions so as to permit mounting thereof in the manner described, while also accommodating cloth of any width which is accommodated in the basket or receptacle 16.

In order to impart rotation to the drum, there is mounted on the outer end of the shaft 72 Fig. 16, a spur gear or pinion 91, and projecting from the adjacent side portion of the frame is an internally threaded or socketed boss 92 receiving the threaded end 93 of a bearing screw or stub shaft 94 on which is rotatably mounted and retained against displacement, a pinion or spur gear 95 the hub or sleeve portion 96 of which has mounted thereon, a crank handle 97 which when operated in a right hand direction, that is, clockwise, will result in the turning of the drum in an anti-clockwise direction as indicated by the arrow in Figure 5 of the drawings. In order that the drum will be brought to a stop and held from turning with the drum in the position shown in Figure 5, so that the end of the cloth may be readily clamped by or released from the gripping means of the drum when the latter is disposed substantially at the top, the ratchet wheel 73 Fig. 16 is provided with a notch or recess 98 in its face disposed against the side of the frame and said side is provided with a suitable spring latch adapted to automatically engage the same when manually released. This latch includes a casing 99 having threaded connection with an aperture or socket threaded in the side of the frame, and receives therein a spring pressed bolt 101 provided with a handle 102 by which it may be withdrawn from the notch 98 against the action of the spring and so held by engagement with the outer end of the casing 99, it being understood that the handle is turned in order to permit the bolt to engage the notch of the ratchet wheel whereby the latter together with the drum will be held from turning when not in use or when clamping or removing the cloth. It is also to be understood that when the spring pressed pin or bolt 79 Figs. 10 and 16 is released from the aperture 76 that the drum may be swung horizontally on its pivot 62 and besides allowing of the removal of any cloth which may have been wound thereon, over the end of the drum, so that the same may be flattened out or folded for wrapping the same quickly and conveniently, permits the bearing sleeve 66 to be disengaged vertically from the pivot 62 whereby the drum may be entirely removed from the machine so as to permit a bolting device to be hereinafter more fully described, to be substituted therefor. Also, in order to strengthen the side of the frame provided with the bearing sleeve at which the drum pivots, a reenforcing web or brace 103 is provided Figs. 1, 2 and 5, the same projecting inwardly at right angles from the adjacent outwardly offset side portion of the frame intermediately of the length thereof and having a base portion 104 secured to the base 10 of the machine. This serves to strengthen and rigidify said frame portion so that the drum may be supported in a true horizontal position and its weight sustained when swung open for removing the cloth or for replacing the drum with the bolting device as will be further explained hereinafter.

Cooperating with the cutting device is a gripping device for the cloth, designed to hold the cloth or similar material while being cut. For this purpose, there is provided on the bars 39 at opposite sides, a pair of right angular rocking members 105 Figs. 2 and 6 pivoted at 106 to opposite sides of the bars as an entirety, detachably and having horizontal gripping arms 107 designed to extend over and cooperate with the top edges of the bars, at which points the latter are roughened as shown at 108 Fig. 1 by means of transverse grooves or the like. These arms or rocking members are provided with vertical extensions 109 and the extremities of the downwardly extended arms are connected by retractile springs 110 to blocks 111 and 112 Fig. 10 at the adjacent extremities of the bars and to which they are detachably secured at the sides of the bars, as through the medium of screws 113 which serve to secure the bars in position as well as to permit the removal thereof when desired or necessary, in addition to serving as anchoring means for the adjacent ends of the springs 110. Thus, it will be seen that the springs 110 normally hold the gripping arms 107 in position to engage the edge of the cloth as it passes over the bars and after the desired length has been reeled off. However, during the movement of the cloth, the guide or carriage of the cutting device is moved to the position shown in Figure 6 of the drawings so that the arms 109 will be engaged by the projecting ends of one of the connections 43 and swung outwardly against the action of the springs 110, which constitute means for normally urging the gripping arms or jaws 107 toward the bars. In this position, said arms or jaws 107 will be raised to permit the cloth to easily travel over the bars and without friction. When it is desired to cut the cloth on a line between the bars 39, the cutter is grasped by the handle 46 and the slide or carriage is moved slightly to the left in the position shown in Figure 6, the arms or extensions 109 being released and the springs 110 acting to move the arms or jaws 107 against the bars so as to clamp and securely hold the adjacent edge of the cloth therebetween. The cutter may then be moved quickly across the machine in its guide and the cutting edge or blade 49 Fig. 14 will quickly and accurately sever the cloth on a line at right angles to the length of the strip. Furthermore, when the slide or carriage is returned to its normal position after the cloth has been cut or severed, said carriage will again engage the extensions 109 so as to move the arms 107 to elevated positions and simultaneously release the cloth. During this operation, the anti-friction members or rollers 44 of the slide or carriage may move freely and without undue friction on the track or guide formed by the bars 39 so that the cutting operation can be very expeditiously carried on and results in considerable advantage over the use of scissors or other methods in use in dry goods stores or the like.

Figure 1:
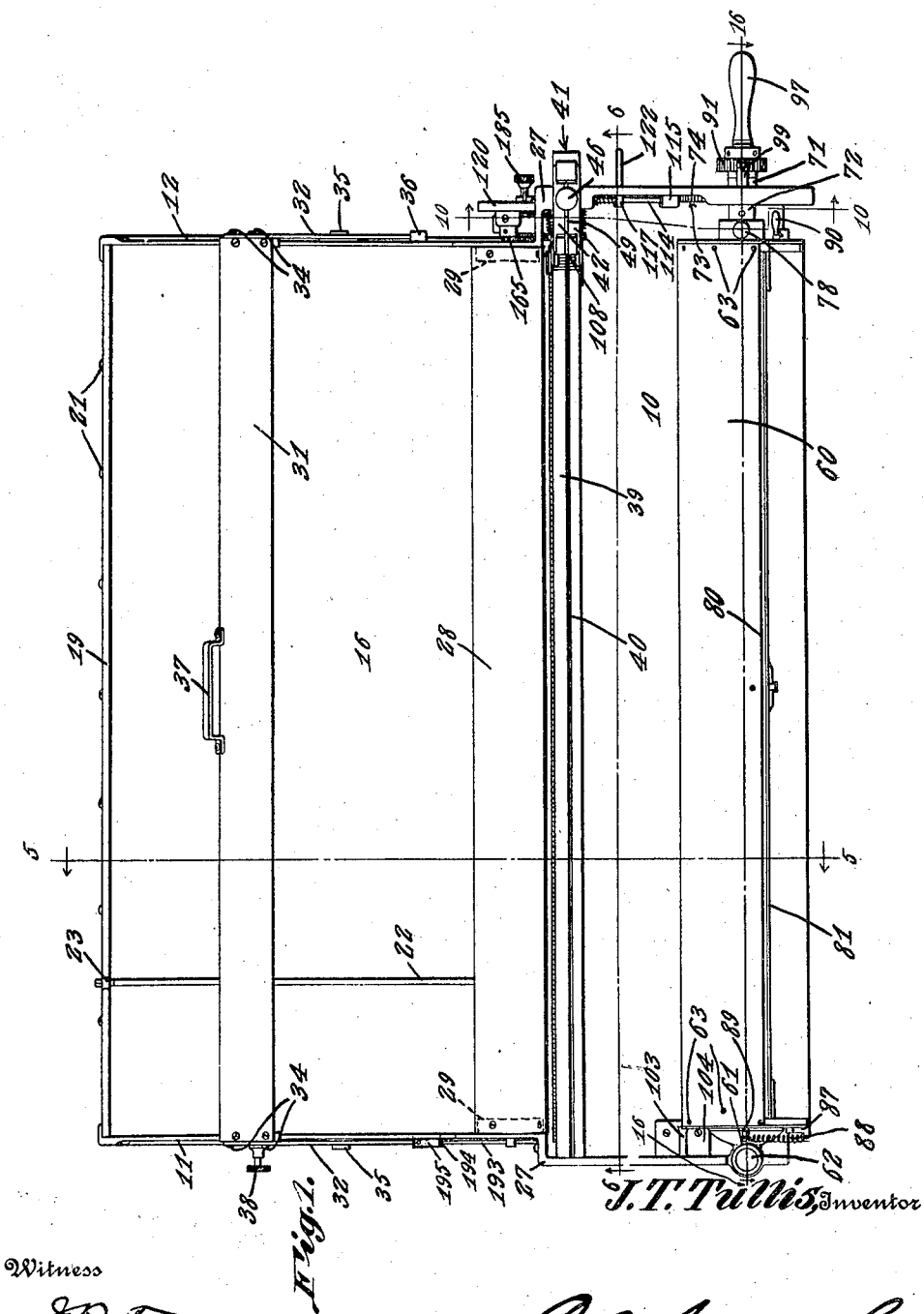
Figure 1 is a plan view of my improved cloth measuring and cutting machine.
Figure 2:
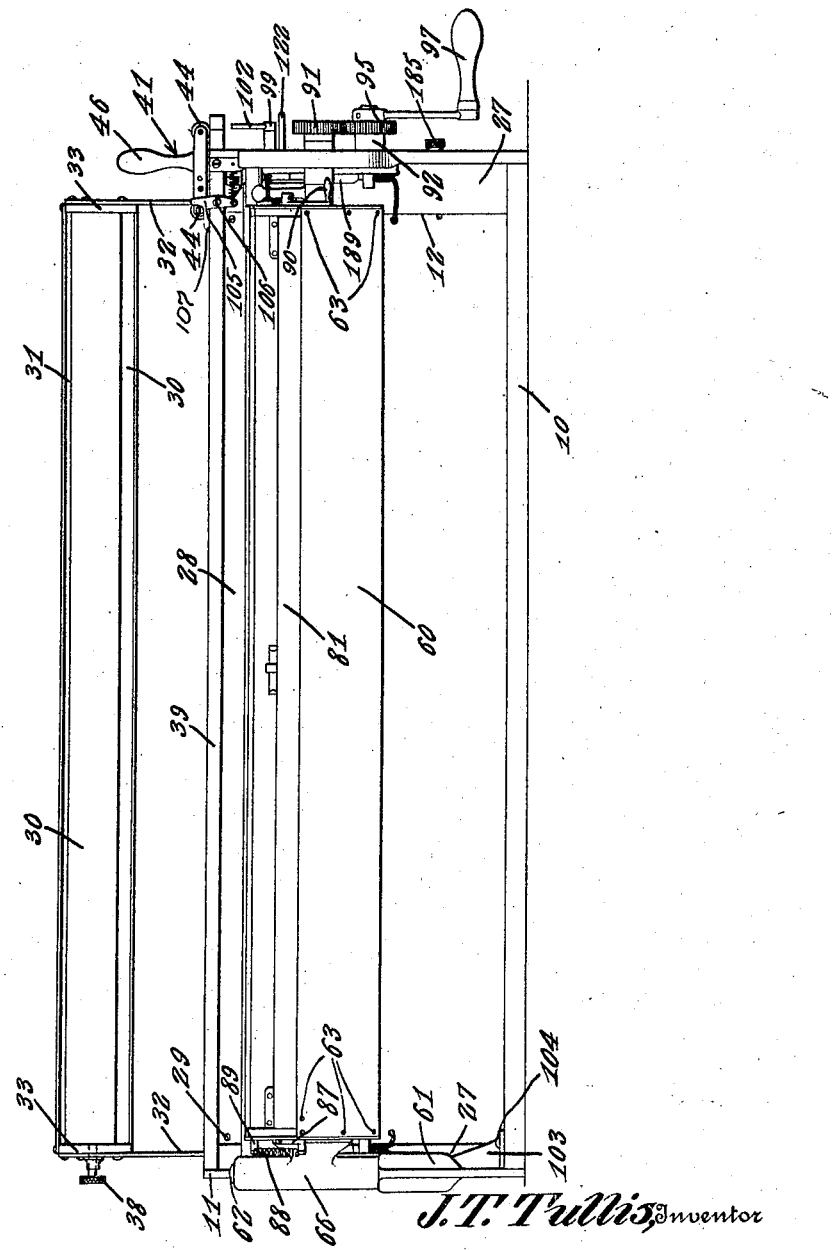
Figure 2 is a front elevation thereof.

Cooperating with the teeth 74 of the ratchet wheel 73 is a sliding bolt or pawl 114 which is mounted to slide in a guide sleeve 115 so as to maintain the same in an inclined position as shown in Figures 10 and 1 of the drawings. In order to normally urge the pawl into engagement with the teeth of the ratchet wheel, there is mounted on said bolt or pawl, an expansible helical spring 116 between a collar 117 and the frame or block 112 at the outwardly offset portion 27 of the frame, so that the spring urges the bolt toward the ratchet wheel and prevents rotation thereof in a clockwise direction when so engaged, while the other end of the bolt protrudes through the frame at the outside and is formed with a reduced portion 118 adapted at times to engage an aperture 119 in a flanged disc 120 fixed on the adjacent end of the shaft of the feeding and measuring roller, as indicated at 121 in Figure 10 of the drawings. In order that the pawl may be disengaged from the ratchet wheel and moved over the surface of the flanged disc 120, the collar 117 is formed with a handle 122 Fig. 1 projecting through a slot 123 Fig. 6 inside of the frame and inclined the same as the sliding bolt or pin 114 and the function of this part of the apparatus is to automatically bring the machine to a stop when a predetermined length of cloth or the like has been measured off by unrolling the same from the bolt and rolling the same on the drum theretofore described.

For this purpose, there is arranged beneath the forward bar 39 Figs. 5, 6, 7 and 10, a graduated bar 124 and in rear thereof and parallel thereto, a feed screw 125, the former being rigidly mounted at its ends in the sides of the frame and the latter being rotatably mounted therein, as particularly seen in Figure 7 of the drawings. The bar 124 is graduated at its vertical front face or edge in yards and fractions thereof, of one quarter each, reading from the right to the left and to any limit within the capacity of the machine, but shown graduated from 1 to 90. The top face or edge of the bar is shown graduated in yards and fractions in a similar manner, but from left to right, starting at zero and ending at 90, the former graduations at the front of the bar or scale being used for measuring off any desired length of cloth and the latter graduations being used when taking stock to determine the number of yards in a bolt, although it may be used for dispensing purposes.

As best seen in Figure 10 of the drawings, the bolt or pawl 114 is provided beneath the graduated or scale bar 124 with a niche or recess 126 and an adjacent groove 127, and carried by the bar 124 at the bottom thereof and adjacent with the extreme right hand end, is a catch plate 128 Fig. 9 which is slidably engaged in contact with the bottom face of the bar, being provided with a pair of longitudinal slots 129 and 130. The slot 129 is adapted to receive a set screw 131 which is adjustably engaged in the bar and serves to retain the plate in position as well as to regulate the degree of movement thereof slidably at the bottom of the bar. An extension 132 is engaged with the bar through the slot 130 and has connected thereto and to a pin 133 carried by and extending downwardly from the plate independently of the bar, a contractile spring 134 which serves to move or draw the plate inwardly. The outer end of the plate is provided with a downwardly extending tapered or beveled projection 135 adapted to engage the niche 126 and adapted to be displaced therefrom and with the bolt or pawl 114, or to move into the groove 127 so that the tapered or pawl end of the bolt may when the projection 135 is engaged in the recess 126, hold the pawl disengaged from the ratchet wheel 73 or teeth 74 thereof whereby the drum may be turned for winding the cloth thereon.

A movable pointer or indicator 136 Figs. 6, 7 and 8 is slidably mounted on the bar 124 and comprises an inverted channel-shaped body the right hand end of which is pointed for cooperating with the graduations on the bar. This body is provided with a pair of spaced depending apertured lugs 137 pivotally carrying an arm or jaw 138 provided with a half-nut 139 adapted to engage the feed screw 125 and normally held in this position by a spring 140 engaged on the pivot 141 of the arm between the lugs or ears 137, receiving the pivot 141, the spring having one arm engaging the body and the other arm engaging the arm or jaw 138, which latter is provided with a depending handle 142 by which the arm 138 may be swung to disengage the half-nut from the feed screw in order that the indicator or pointer may be adjusted along the scale bar to any desired point irrespective and free of the feed screw for the purpose to be hereinafter more fully set forth.

Arranged beneath the feed roller 28 adjacent to the outwardly offset portions 27 is a shield or casing 143 Figs. 5 and 6 suitably secured in position to extend the entire width of the frame and provided with a longitudinal view slot 144. As shown, the sides 11 and 12 are provided with inwardly extending blocks or projections 145 Figs. 6 and 11 to which the casing 143 is detachably secured as by means of screws or the like 146. Secured along the bottom edge of the slot 144 is a scale plate 147 intermediately scaled or graduated in divisions designating prices per yard for the cloth in customary sales amounts, preferably from seven cents to four dollars, although it is to be understood that the amounts may vary from those shown in Figure 6 of the drawings. As shown, particularly in Figure 6 of the drawing, the markings preferably begin at the left with $.07 and end at the right with $4.00. Rotatably mounted in the casing 143 adjacent to the slot 144 is a roller 148 and rotatably mounted in the bottom of the casing parallel to the roller 148 is a roller 149 to which and the roller 148, the ends of a tape 150 are secured, said tape being graduated in prices or cost in fractions of yards from one-quarter up to ninety yards as indicated at 151 and having at each side or margin, an indication of the length in yards or fractions thereof, as indicated at 152 Fig. 6. The latter markings are located beyond the ends of the graduated portion of the plate 147, while the markings 151 correspond or align with the divisional markings on the stationary plate or scale device 147, as distinguished from the tape or chart 150, which constitutes a movable scale device.

The blocks or projections 145 are preferably detachably secured in position as through the medium of screws or the like 153 Fig. 11 which are passed through the sides of the frame, thus permitting convenient assemblage and disassemblage of the parts. The roller 148 is provided with an intermediate apertured bearing wall or partition 154 Fig. 11 engaged by the unthreaded end 155 of a screw 156 having its opposite end fixed to the adjacent block 145 as by means of a threaded connection 157, and mounted on the screw 156 is a nut 158 held from turning in a slot 159 longitudinally in the adjacent end portion of the roller 148 so that as the latter rotates, the nut will turn therewith while the screw remains stationary, the nut being held from turning with respect to the roller by engagement with the slot as aforesaid, and thus, the nut will be shifted toward the partition or bearing wall 154 to serve as a stop to limit the turning of the roller and to return to the opposite position when the roller is turned in the opposite direction. The purpose of this device is to prevent the ends of the tape or chart from being detached or pulled loose, the nut 158 by engagement with the block 145 at the outer end of the slot 159, serving to limit the rotation or movement in the opposite direction. The tape is normally wound on the roller 149 and for this purpose a spring 160 is provided, said spring being anchored at one end to the frame as shown at 161 and having its opposite end anchored to the roller. For this purpose the spring is disposed within the roller around an axial pin 162 rotatably supporting the adjacent end of the roller in the block 145 at that end and to which the adjacent end of the spring is fixed, while the opposite end of the pin is fixed to a partition 163 rigid with the roller and having the inner end of the spring fixed thereto as shown at 164.

In this manner, the spring 160 will normally wind the tape of the chart on the roller 149 so as to unwind the same from the roller 148, but the tape may be wound on the latter roller from the former roller, while unwinding from the latter when the tape constituting a part of the measuring and indicating device, is operated. This is effected through the medium of the feed roller 28, and for this purpose, there is mounted on the shaft of the roller 28, a spur gear 165 Figs. 1, 7 and 17 which is positioned inwardly of the disc 120, adjacent to one end of the bolt 114. The pinion or gear 165 meshes with a relatively large gear 166 Fig. 17 the shaft 167 of which carries a pinion 168 which meshes with a gear 169 on the shaft 173 Fig. 11 of the roller 148 so that the said roller may be rotated to wind the tape thereon and advance the marking or chart on the tape one-fourth of a yard for each complete revolution of the roller 28. As this roller is 9 inches in circumference, or one-fourth of a yard, it will be seen that as the cloth is unwound from the bolt and onto the drum as it passes between the rollers 28 and 30 and over the former, this cloth will be accurately measured from the slot 40 between the bars 39. The markings begin at one-quarter of a yard, because the distance of the unmeasured cloth between said slot and the point of engagement with drum 60 Fig. 5 is one-fourth of a yard and during this action, the spring 160 Fig. 11 will be wound so as to exert its tension in the opposite direction whereby the roller 149 will be rotated in the opposite direction to unwind the tape from the roller 148 and onto the roller 149, when the roller 148 is released as hereinafter explained to permit it to rotate in the opposite direction under the action of the spring 160.

The gear 166 also meshes with a pinion 170 on the feed screw 125 so that the latter may be rotated to impart movement to the pointer or indicator 136 and to cause the same to indicate by proper movement along the bar 124, the number of yards which have been reeled off. In dispensing a certain length of material, the pointer or indicator is moved along the bar 124 until the pointer approaches the number or indication corresponding to the number of yards to be measured off, reading from the right to the left at the front of the bar as shown in Fig. 6. This is done by pulling forwardly on the handle 142 to swing the same on the pivot 141 against the action of the spring 140 whereby to lower and disengage the half-nut from the feed screw 125 as will be readily apparent from an inspection of Figure 8 of the drawings. As the cloth moves along, the pointer will approach the right hand end of the bar at the zero marking and by engagement with the releasing device or catch plate 128 Fig 9, the latter will be shifted longitudinally in an outward direction toward the right on its supports as permitted by the slots 129 and 130 against the action of the spring 134, thus releasing the bolt 114 Fig. 10 and permitting it to move under the action of the spring 116 after the projection 135 is displaced from the niche 126. This permits the pawl or tapered end of the bolt to engage the rachet wheel teeth 74 whereby the automatic stopping device is effected to prevent further feeding or rotation of the drum and when the aperture or recess 119 is brought beneath the reduced portion 118, the latter will engage therewith to prevent further rotation of the feed roller.

In order to connect the roller 148 operatively with the feeding and measuring roller so that the roller 148 will be turned to wind the tape thereon simultaneously and uniformly according to the length of the cloth measured off, or to permit disconnection, that is to break the operative connection between the feed roller and the upper tape roller of the measuring and indicating mechanism, a clutch is interposed in the drive connection and embodies an outer clutch member 171 Figs. 11 and 15 fixed to the shaft of the roller 148 and frictionally engaged by an inner clutch member or cone 172, the former together with the gear 169 being keyed or fixed to the shaft 173 of the roller 148 as shown at 174 and the latter being splined thereon as indicated at 175 so as to be moved into and out of engagement with the outer section or cup 171. In order to hold the clutch normally engaged, the hub of the cone or inner clutch section 172 carries a swiveled extension 176 Fig 15 provided with a vertical slot 177 Fig. 11 receiving the slotted upper end or short arm of a lever 178 pivoted as shown at 179 on the side of the frame at the outwardly offset portion adjacent thereto. In the slot 177 is disposed a cross pin 180 engaged in the slot 181 in the lever 178, while the long arm of the lever extends downwardly and is apertured as indicated at 182 to receive a plunger 183 therethrough. The lever is disposed between a collar 184 and an enlargement or nut 185 threaded on the outer end of the plunger, while an expansible helical spring 186 is also mounted on the plunger between the collar and a plate 187 disposed over a slot 188 in the adjacent side wall 12 of the frame or casing.

In this manner, the spring will normally hold the clutch engaged so as to operatively connect the gears and shafts of the feeding and measuring or indicating mechanism. When the device has been in use and the tape or chart has been operated to indicate the length of the material or cloth reeled upon the drum, as it passes from the bolt, through the feeding mechanism and is wound on the drum, the tape or chart will be wound upon the roller 148 from upon the roller 149 against the action of the spring 160, said tape may be rewound on the roller 149 by disengagement of the clutch to break the operative connection above mentioned, by re-pressing the lever 178 through the medium of the nut, head or enlargement 185, against the action of the spring 186. The spring 160 will then be free to act in order to rotate the roller 149 in the opposite direction to wind the tape thereon from upon the roller 148, thus returning the markings or graduations to the initial or starting position. It is also to be understood that when the device is used for dispensing a certain length of cloth or the like, the length or number of yards desired is indicated by moving the pointer 136 in the manner heretofore described, along the bar 124 through the medium of the handle 142, the pointer cooperating with the graduations on the front of the bar 124 as indicated in Figure 6 of the drawings, it being understood that the half-nut is disengaged from the feed screw 125 so as to throw the feeding mechanism for the pointer out of operative connection with the latter or to operatively disconnect the pointer. When the feed screw is rotated by the running of the material over the feed roller and through the medium of the drive connections or gears, the pointer or indicator will be moved toward zero (0) and will shift the catch plate 128 to release the bolt 114 whereby the drum or winding means will be prevented from rotating further and the feed roller will continue to rotate until the recess 119 is engaged by the opposite end or reduced portion 118 of the bolt or pin 114 constituting a part of the stopping device automatically operative when such predetermined length of material or number of yards of cloth have been measured off. This action takes place against the spring 134, Fig. 9, which spring afterward, upon the setting of or withdrawal of the pointer from the plate 128, serves to move the catch to an operative position whereby the device may be reset in conjunction with the bolt 114 through the medium of the handle 122 Figs 1 and 6.

In this operation, the projection 135 is engaged with the wall of the niche 126 by shifting the bolt 114 against the action of the spring 116 to disengage the tapered or pawl end of the bolt from the ratchet teeth or notches 74 of the ratchet wheel 73, the opposite end of the bolt moving over the disc 120 at the flange thereof, so that said disc is freely rotated without being stopped or being interrupted until the stopping device has been released or brought into play. Thus, any length within the capacity of the machine, can be measured off and rolled, wound up or reeled to be folded or otherwise, and as shown, any length between one-quarter of a yard and 90 yards may be measured with the machine as shown. The ends of the markings or graduations on the bar 124 preferably terminate at spaced points or distances from the ends thereof in order to accommodate the catch plate of the releasing and stopping device at the right and the sleeve portion and mounting of the indicator 136 at the left in order that the pointer may start at the graduation marked "90".

In order to illuminate the markings when the device is operative and the pressure roller is lowered upon the feed roller, suitable means are provided and for this purpose and as shown, a pair of lamps including reflectors 189, Figs. 5 and 6 are detachably secured at the corners of the outwardly offset portions of the frame, indicated at 27, as shown at 190 Fig. 10 and carry incandescent lamp bulbs or electric lights 191, the reflectors being disposed to project the rays of light toward each other and the slot through which the chart is exposed, as well as the scale bar or plate 147. The lamps are connected with a source of current by suitable wires 192 Fig. 6 which include extensions 193 Fig. 3 mounted on the frame through the medium of a non-conducting or insulating block 194 and including a normally separated spring switch 195 having a stationary contact and a movable spring contact adapted to be engaged by the arm 32 at one side and thereby closed so as to close the circuit through the illuminating means or electric lamps so that the same will be ignited or thrown into operation for the purposes set forth. Of course, when the pressure roller is raised or swung to an inoperative position, that is from a position in which it exerts pressure on the feed roller, the arms will be swung on their pivots and one of the arms will be released from the switch 195 thus allowing the movable contact to separate from the stationary contact so as to open the circuit through the lamps and extinguish the same, thus throwing the illuminating means out of operation.

The top of the bar 124 is used for the purpose of measuring goods or material in strip form, such as cloth or papers, when taking an inventory of stock and when so doing, the pointer 136 is moved to the extreme left hand position of the bar to cooperate with the markings at the top thereof, beginning at zero on the left and according to the number of yards or lengths of the material in the bolt, the pointer will be moved to the right and indicate the number of yards within the limit or capacity of the machine, and as shown, 90 yards may be measured off before the machine will automatically stop in the same manner as heretofore described. In this connection, the roller or drum 60 may be employed but as the goods is preferably to be placed in stock or on exhibition for sale, it is desirable to obviate the necessity of a further additional and unnecessary operation in rebolting the same, and for this purpose the goods or cloth is preferably wound directly on a bolt, consisting of a flat section of wood, pasteboard or the like as designated at 196 Figs. 18 and 19. In order to support this device in position, the roller or drum 60 is removed, first by withdrawing or disengaging the spring pressed latch bolt 79 so that the adjacent open sided end or projection 77 may be disengaged from the flattened portion of the shaft 72 by swinging said roller or drum horizontally on the pivot 62 through the medium of the vertical bearing sleeve 66 and then by raising the roller so as to disengage or displace said sleeve from the pivot 62.

Figure 19:
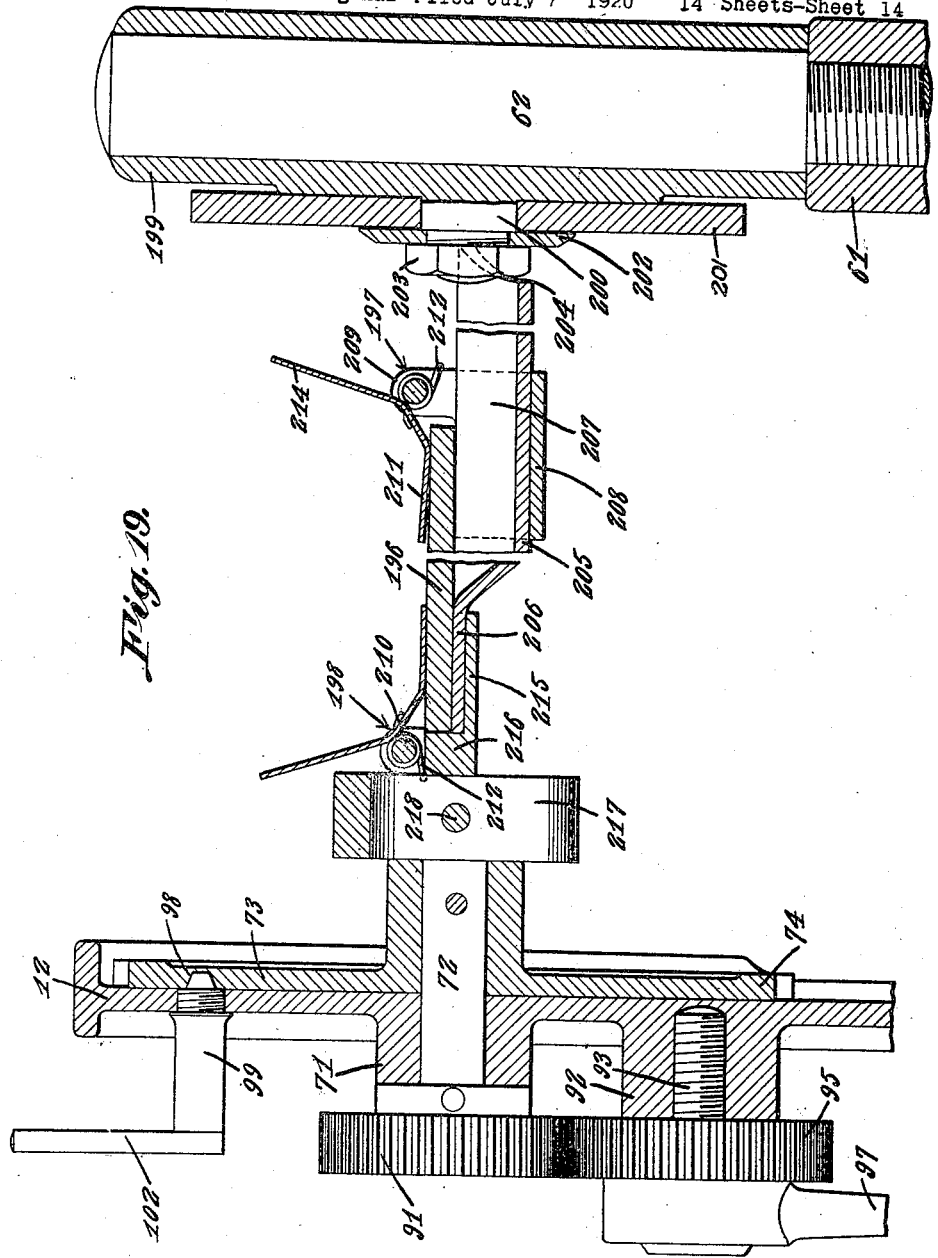
Figure 19 is a view similar to Figure 16 showing the bolting device applied in lieu of the winding cylinder.

The roller or drum is then replaced by the bolt holder shown particularly in Figures 18 and 19 of the drawings, which device includes means adapted to be supported in position in lieu of the roller and drum for rebolting the cloth without the necessity of employing a supplementary frame therefor as is old in the art and which requires extra attaching devices not essentially a part of the complete machine. This device includes end clamps or bolting board holder 197 and 198, one detachably carried by the spindle or pivot 62 and the other detachably engageable or carried by the flattened portion of the shaft 72 to be rotated thereby through the medium of the gears 91 and 95 Fig. 2 and the crank handle 97, although it is to be understood that any suitable means may be provided for driving or turning said shaft by hand or power, as it is thought will be obvious. This device includes the vertical bearing sleeve 199 designed to detachably engage the pivot 62 in the same manner as the sleeve 66 and is provided intermediately with a laterally extending and horizontally projecting shank or stub shaft 200 on which is mounted a washer or plate 201 for contact with the edge of the cloth to cause the same to be evenly wound on the rebolting device including the board or bolt holder 196 heretofore mentioned, and which is detachably supported in position by the clamps or holders so that it can be removed when the desired length of goods or cloth is wound thereon, in strip form, so that the operation may be continued, the bolts being placed in stock or otherwise. The large washer or evener plate or disc 201 has engaged on the shank or stub shaft outwardly thereof and in contact therewith, a retaining washer 202. The plate 201 is retained in position by a nut 203 which is engaged on the threaded end of the shank or stub shaft 200, said plate being apertured as indicated at 204 to accommodate the nut at its laterally extending portion 205 which is offset from the axis and which extends parallel thereto but at right angles to the bearing and the evener plate, except that the free end thereof as shown at 206, Fig. 19 which portion is disposed diametrically or across the center or axis of the pivot or shaft 200. The plate portion 205 Fig. 18 forms a stationary jaw and is stiffened to give added strength thereto, by means of a longitudinal rib or bead 207 pressed into the same from the aperture or semi-circular cut-out 204 at the point of bend of the portion 205 from the plate 201 or its juncture therewith. Movably mounted on the beaded portion of the plate 205 is a U-shaped bracket 208 having spaced apertured ears or lugs 209 between which is engaged a pivot 210 carrying a spring pressed movable jaw 211, the spring thereof being designated by 212 and mounted on the pivot in recesses 213 adjacent to each end of the pivot or the side edges of the plates. Two of such springs are preferably employed, and the ends thereof are disposed against the lugs or ears and the top of the jaw respectively, so as to hold said jaw in position to clamp the bolt holder 196 in position but permit it to be released by depressing the handle or finger engaging portion 214 bent upwardly therefrom intermediately so as to rock said door on its pivot, as it is thought will be readily apparent. The free end of the plate 205 at the portion 206, together with the adjacent end of the holder 196, are held in position by a clamp heretofore designated 198 and corresponding in construction to the clamp just described, except that the bracket 215 engages the portion 206 and is formed with a solid extension 216 and a vertical flange 217 carrying a spring pressed bolt 218 adapted to connect or couple detachably with the adjacent end of the shaft 72. In this manner, either the drum or the bolt holder may be interchangeably used and when the drum is used, the cloth rolled thereon may be slipped off endwise by swinging the drum to an open position and flattened out for folding and wrapping. When the bolting device is used, the cloth will be bolted on a wooden or pasteboard bolt holder ready to place in stock, thus greatly facilitating the handling of goods in either instance, facilitating sales or dispensing of goods as well as taking an inventory of stock. The measuring and indicating mechanism will serve to indicate any desired number of yards to be dispensed and it is only necessary to set the indicator for the length desired and when such length has been reeled off, the machine will be automatically stopped and the cloth may be quickly severed. In addition, the computing mechanism will indicate the exact cost of the goods irrespective of the length thereof and the price per yard or fraction thereof. These figures will be discernible and will obviate the necessity of calculations by the employee or clerk so that the cost of help will be considerably reduced. The rebolting device will indicate to an exact degree, the length of material in stock and will in general greatly facilitate handling of business.

Having thus described the invention what I claim is:

1. In a cloth measuring machine, the combination with cloth winding and measuring rollers, of a concave basket, a rod above and parallel with one side of the basket, a segmental partition projecting into and spaced from the basket, one of the partitions being adjustable on the rod, a roller carried by the other end of the partition and movably mounted on the basket, and means for securing the partition against movement relative to the basket.

2. In a cloth measuring machine, the combination with a basket and a winding roller, of a measuring roller interposed between the basket and winding roller, a pressure roller, a support for the pressure roller mounted for swinging movement, and adjustable means for retarding the rotation of the pressure roller.

3. In a cloth measuring machine, the combination with a basket, a winding roller and a measuring roller interposed between the winding roller and the basket, of an indicator geared to the measuring roller, means illuminating the indicator, a pressure roller, a support therefor mounted for swinging movement, and means actuated by the support for closing an electric circuit to the illuminating means.

4. In a cloth measuring machine, the combination with a winding roller and a measuring roller, of spaced parallel bars interposed between the rollers for supporting cloth between the rollers, a carriage movably mounted on the bars, a cutting blade having a forwardly and upwardly inclined bottom edge extending into the space between the bars, a plate depending from the carriage and slidable between the bars, and spring pressed anti-friction means carried by the plate and bearing against the bottom faces of the bars.

5. In a cloth measuring machine, the combination with winding and measuring rollers, of parallel spaced bars for supporting cloth between the rollers, a cloth clamp mounted adjacent one end of the bars, yielding means for holding the clamp normally in clamping position, a carriage movably mounted along the bars, a cutting blade depending therefrom and between the bars, and cooperating means upon the clamp and carriage for shifting the clamp to cloth releasing position when the carriage is brought to one limit of its movement.

6. In a cloth measuring machine, the combination with a measuring roller, of a stub shaft mounted for swinging movement relative to the measuring roller, a winding roller journaled at one end upon said shaft and mounted to swing therewith, an operating shaft, a recessed extension carried by the other end of the winding roller and movable to position upon the operating shaft, and means carried by the winding roller for detachably securing together the extension and operating shaft to hold the operating and stub shafts in alinement.

7. In a cloth measuring machine, the combination with a measuring roller, of a stub shaft mounted for swinging movement relative to the measuring roller, a winding roller journaled at one end on the stub shaft and mounted to swing therewith, a recessed extension upon the other end of the winding roller, an operating shaft projecting into the path of the extension and adapted to be engaged thereby when the axis of rotation of the winding roller is brought into line with the shaft, and means for detachably connecting the said shaft and extension.

8. In a cloth measuring machine, the combination with a measuring roller, of an operating shaft, a ratchet wheel mounted for rotation therewith, a spring controlled pawl normally engaging the ratchet wheel to prevent rotation thereof in one direction, means for engaging the pawl to hold one end thereof out of engagement with the ratchet wheel, a feed screw mounted for rotation and geared to the measuring roller, and means adjustably mounted on and shiftable by the feed screw for disengaging the pawl from its holding means.

9. In a cloth measuring machine, the combination with a measuring roller and a winding roller, of a feed screw actuated by the rotation of the measuring roller, a ratchet wheel rotatable with the winding roller, a spring pressed pawl normally engaging the ratchet wheel to hold the winding roller against rotation, a bar parallel with the feed screw and graduated to indicate units of linear measure and fractions thereof, a yieldingly held projection movably connected to said bar for engaging the pawl to hold it disengaged from the ratchet wheel, and means adjustable along the feed screw and bar and shiftable by the feed screw for engaging said projection to move it and release the pawl.

10. In a cloth measuring machine, the combination with a measuring roller and a winding roller, of a feed screw actuated by the rotation of the measuring roller, a ratchet wheel rotatable with the winding roller, a spring pressed pawl normally engaging the ratchet wheel to hold the winding roller against rotation, a bar parallel with the feed screw and graduated to indicate units of linear measure and fractions thereof, a yieldingly held projection movably connected to said bar for engaging the pawl to hold it disengaged from the ratchet wheel, and means adjustable along the feed screw and bar and shiftable by the feed screw for engaging said projection to move it and release the pawl, and an indicator carried by said adjustable means on the feed screw cooperating with the graduations on the bar for designating a selected length of material to be cut.

11. In a cloth measuring machine, the combination with a winding roller and a measuring roller, of a feed screw geared to the measuring roller, a bar parallel with the feed screw and graduated to indicate units of linear measure, a ratchet wheel rotatable with the winding roller, a spring pressed pawl normally engaging the ratchet wheel to hold said roller against rotation in one direction, a yieldingly held projection for engaging the pawl to hold it disengaged from the ratchet wheel, an indicator slidably mounted on the bar and cooperating with the graduations thereon to designate the length of material to be cut, and means movably connected to the indicator for adjustably engaging the feed screw, said indicator being shiftable to disengage the projection and release the pawl.

12. In a cloth measuring machine, the combination with a measuring roller, of a winding roller, a longitudinal slot in the periphery of the roller, an inwardly extended jaw constituting one wall of the slot, a clamping plate pivotally mounted within the slot and cooperating with said wall to grip one end of a strip of cloth, an outwardly extending portion integral with the plate, and an eccentric operatively engaging said portion to hold the plate in clamping position.

13. In a cloth measuring machine, the combination with a measuring roller, of a winding roller having a longitudinal slot in its periphery, an inwardly extending portion in the winding roller constituting one wall of the slot, a clamping plate pivotally mounted in the slot and having an outwardly projecting portion, an eccentric rotatably mounted in the slot for engaging said extending portion, and means for holding the eccentric normally pressed against said portion, the plate and wall cooperating to grip a fabric interposed between them.

14. In a cloth measuring machine, the combination with a measuring roller, of a structure mounted to swing relative to said roller, cloth winding means carried by and movable with said structure, a recessed extension at one end of said means, an operating shaft in the path of and adapted to be embraced by the extension, means for securing the extension to the shaft, and cloth gripping means carried by the winding means.

15. A machine of the class described comprising the combination with a frame having a base portion and spaced sides; of a basket mounted between said sides and on said base, said basket comprising a sheet of material bent in concaved form and disposed so that the sides of the frame will close the ends thereof, connecting rods between said sides, the ends of said sheet material being turned downwardly, one end being disposed intermediately of the length of the frame and having its lower edge anchored to one of said connecting rods, the other end being turned over the other connecting rod and having its lower end anchored to the adjacent end of the base.

16. A machine of the class described comprising the combination with a frame having a base portion and spaced sides; of a basket mounted between said sides and on said base, said basket comprising a sheet of material bent in concaved form and disposed so that the sides of the frame will close the ends thereof, connecting rods between said sides, the ends of said sheet material being turned downwardly, one end being disposed intermediately of the length of the frame and having its lower edge anchored to one of said connecting rods, the other end being turned over the other connecting rod and having its lower end anchored to the adjacent end of the base, a partition fitting in the basket, and means for adjustably supporting the partition, said partition having anti-friction means supporting the same.

17. A machine of the class described comprising the combination with a frame having a base portion and spaced sides; of a basket mounted between said sides and on said base, said basket comprising a sheet of material bent in concaved form and disposed so that the sides of the frame will close the ends thereof, connecting rods between said sides, the ends of said sheet material being turned downwardly, one end being disposed intermediately of the length of the frame and having its lower edge anchored to one of said connecting rods, the other end being turned over the other connecting rod and having its lower end anchored to the adjacent end of the base, a rod above the first-named turned portion at the inner side of the basket, a partition having a sleeve portion movably engaging the rod, means engaged with the sleeve to hold the partition in adjusted position along the rod, and a roller at the opposite end of the partition and movable on the other turned portion at the outer end of the basket.

18. A measuring and cutting machine of the class described comprising a frame having a base, said base having a bolt receiving basket at one end, a feed roller journaled in the frame, a pressure roller cooperating therewith, a winding device adapted to receive the end of the cloth after passing over the feed roller, a measuring device cooperating with the feed roller and including means for indicated length and cost, according to a predetermined linear measure and for units or fractions thereof, a bar carried by the frame parallel to the feed roller and over which the cloth passes, a cutter movably carried thereby to sever the cloth, clamping means for the cloth at one end of the bar and cooperating means upon the cutter and clamping means for moving said clamping means out of operative position when the cutter is brought to one limit of its movement, said cutter having a blade resiliently held in operative position, and means for causing the machine to stop at a predetermined time.

19. In a cloth measuring machine, the combination of a measuring roll, a structure mounted for swinging movement relative to the measuring roll, an actuating shaft, a ratchet wheel rotatable with said shaft, a winding member mounted to swing with said structure and to rotate about its individual axis, a recessed projection on the winding member for engagement with the actuating shaft, means for detachably connecting said projection and the shaft, a spring pressed pawl normally engaging the ratchet wheel to hold the shaft against rotation, means for holding the pawl disengaged from the ratchet wheel, and adjustable timed means geared to the measuring roll for automatically releasing the pawl to engage the ratchet wheel after a predetermined movement of the measuring roll.

In testimony that I claim the foregoing as my own, I have hereto affixed my signature in the presence of two witnesses.

JOHN THOMAS TULLIS.

Witnesses:
SYD McMATH,
GEO. S. SPROGINA, Jr.